United States Patent
Broski et al.

(10) Patent No.: US 8,655,261 B2
(45) Date of Patent: Feb. 18, 2014

(54) RF REDIRECTION MODULE AND SYSTEM INCORPORATING THE RF REDIRECTION MODULE

(75) Inventors: Thomas Broski, Fort Wayne, IN (US); Kevin L. Laughlin, Fort Wayne, IN (US)

(73) Assignee: Raytheon Company, Waltham, MA (US)

( * ) Notice: Subject to any disclaimer, the term of this patent is extended or adjusted under 35 U.S.C. 154(b) by 892 days.

(21) Appl. No.: 12/717,299

(22) Filed: Mar. 4, 2010

(65) Prior Publication Data

US 2011/0021135 A1 Jan. 27, 2011

Related U.S. Application Data

(60) Provisional application No. 61/159,894, filed on Mar. 13, 2009.

(51) Int. Cl.
*H04K 3/00* (2006.01)

(52) U.S. Cl.
USPC ......... 455/1; 455/67.11; 455/450; 455/553.1; 455/562.1; 340/10.3; 342/14; 370/227; 375/219

(58) Field of Classification Search
USPC .............. 455/1, 67.11, 445, 450, 463, 550.1, 455/553.1, 562.1; 340/10.3; 342/14, 16, 17; 370/227, 278; 375/219
See application file for complete search history.

(56) References Cited

U.S. PATENT DOCUMENTS

| | | |
|---|---|---|
| 5,255,318 A | 10/1993 | Gurusami et al. |
| 5,633,873 A | 5/1997 | Kay et al. |
| 5,703,881 A | 12/1997 | Kay et al. |
| 5,734,699 A | 3/1998 | Lu et al. |
| 5,734,979 A | 3/1998 | Lu et al. |
| 5,758,287 A | 5/1998 | Lee et al. |
| 5,835,564 A | 11/1998 | Chang et al. |
| 5,999,813 A | 12/1999 | Lu et al. |
| 6,173,177 B1 | 1/2001 | Lu et al. |
| 6,212,395 B1 | 4/2001 | Lu et al. |
| 6,597,912 B1 | 7/2003 | Lu et al. |
| 6,640,108 B2 | 10/2003 | Lu et al. |
| 2010/0137025 A1* | 6/2010 | Tal et al. .................... 455/553.1 |

* cited by examiner

*Primary Examiner* — Shaima Q Aminzay
(74) *Attorney, Agent, or Firm* — Daly, Crowley, Mofford & Durkee, LLP

(57) ABSTRACT

An RF redirection module incorporated into an RF system already having a receive antenna and a first transmit antenna allows the RF system to be coupled to a second transmit antenna and to provide a transmit signal to the second transmit antenna.

13 Claims, 5 Drawing Sheets

RF REDIRECTION MODULE AND SYSTEM INCORPORATING THE RF REDIRECTION MODULE

CROSS REFERENCE TO RELATED APPLICATIONS

This application claims the benefit under 35 U.S.C. §119 (e) of U.S. Provisional Application No. 61/159,894 filed Mar. 13, 2009, which application is incorporated herein by reference in its entirety.

FIELD OF THE INVENTION

The structures and techniques described herein relate to radio frequency (RF) systems, and, more particularly, to multifunction RF systems.

BACKGROUND OF THE INVENTION

A radio frequency system referred to as a Multifunction System (MFS) is known. The MFS is based upon hardware previously developed. The MFS includes up to four receiver-exciter modules (REMS) coupled through an RF distribution module (also known as an RFD) to a single receive antenna and to a single transmit antenna (more specifically through a transmit power amplifier coupled to the transmit antenna).

The MFS has both receive and transmit capability. The MFS is operable to detect a radio transmission from a remote radio frequency (RF) system, for example, an enemy military communication system, and to transmit a jamming signal to jam the remote system.

From discussion below in conjunction with FIGS. 1-3, it will be recognized that the conventional MFS can transmit only one transmit signal using only one transmit antenna, and therefore to jam only one remote RF system. However, it would be desirable to provide an MFS that can transmit a plurality of transmit signals using a plurality of transmit antennas, and therefore operable to jam a plurality of remote RF systems, without changing the overall architecture of the MFS.

SUMMARY OF THE INVENTION

The present invention provides a modified MFS that can transmit a plurality of transmit signals using a plurality of transmit antennas without changing the overall architecture of the MFS.

In accordance with one aspect of the present invention, an RF redirection module includes a first bidirectional input/output port configured to receive an RF receive signal or to output an RF transmit signal. The RF redirection module also includes a second bidirectional input/output port configured to output the RF receive signal or to input the RF transmit signal. The RF redirection module also includes an RF output port configured to output a signal representative of the RF transmit signal. The RF redirection module also includes a control port coupled to receive a control signal. In response to the control signal, the RF redirection module is configured either: a) to receive the RF receive signal at the first bidirectional input/output port, to output the RF receive signal at the second bidirectional input/output port, and to output no signal at the RF output port, b) to receive the RF transmit signal at the second bidirectional input/output port, to output the signal representative of the RF transmit signal at the RF output port, and to input or output no signal at the first bidirectional input/output port, or c) to receive the RF transmit signal at the second bidirectional input/output port, to output the RF transmit signal at the first bidirectional input/output port, and to output no signal at the RF output port.

In accordance with another aspect of the present invention, an electronic system for jamming a signal generated by a remote RF transmitter includes a plurality of receiver-exciter modules, each operable to receive an RF receive signal, to process the RF receive signal, and to generate an RF transmit signal in response to the RF receive signal. The electronic system also includes an RF distribution module coupled to communicate the RF receive signal to the plurality of receiver-exciter modules and coupled to receive the RF transmit signal from the plurality of receiver-exciter modules. The RF distribution module is further coupled to a receive antenna associated with the RF receive signal and to a first transmit antenna associated with the first RF transmit signal. The electronic system also includes a control processor coupled to the plurality of receiver-exciter modules and configured to generate a control signal operable to place each one of the plurality of receiver-exciter modules into a respective receive configuration or into a respective transmit configuration. The electronic system also includes an RF redirection module coupled between at least one of the plurality of receiver-exciter modules and the RF distribution module and further coupled to a second transmit antenna. The RF redirection module is configured to direct signals in one of a first path or a second path. The first path is between the at least one of the plurality of receiver-exciter modules and the RF distribution module and the second path is between the at least one of the plurality of receiver-exciter modules and the second transmit antenna.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

As used herein the term "receive signal" is used to describe an electronic representation of an RF signal received by a receive antenna. The receive signal can take various forms, for example, amplified or non-amplified, frequency shifted or non-frequency shifted, each of which is still representative of the RF signal received by the receive antenna.

Similarly, as used herein the term "transmit signal" is used to describe an electronic representation of an RF signal transmitted by a transmit antenna. The transmit signal can also take various forms, for example, amplified or non-amplified, frequency shifted or non-frequency shifted, each of which is still representative of the RF signal transmitted by the transmit antenna.

When preceded by the term "radio frequency" or "RF," it will be understood that the receive signal and the transmit signal, i.e. the RF receive signal and the RE transmit signal, are in an electronic form and at radio frequencies as may be generated by the receive antenna or as may be communicated to the transmit antenna.

Figure 1:
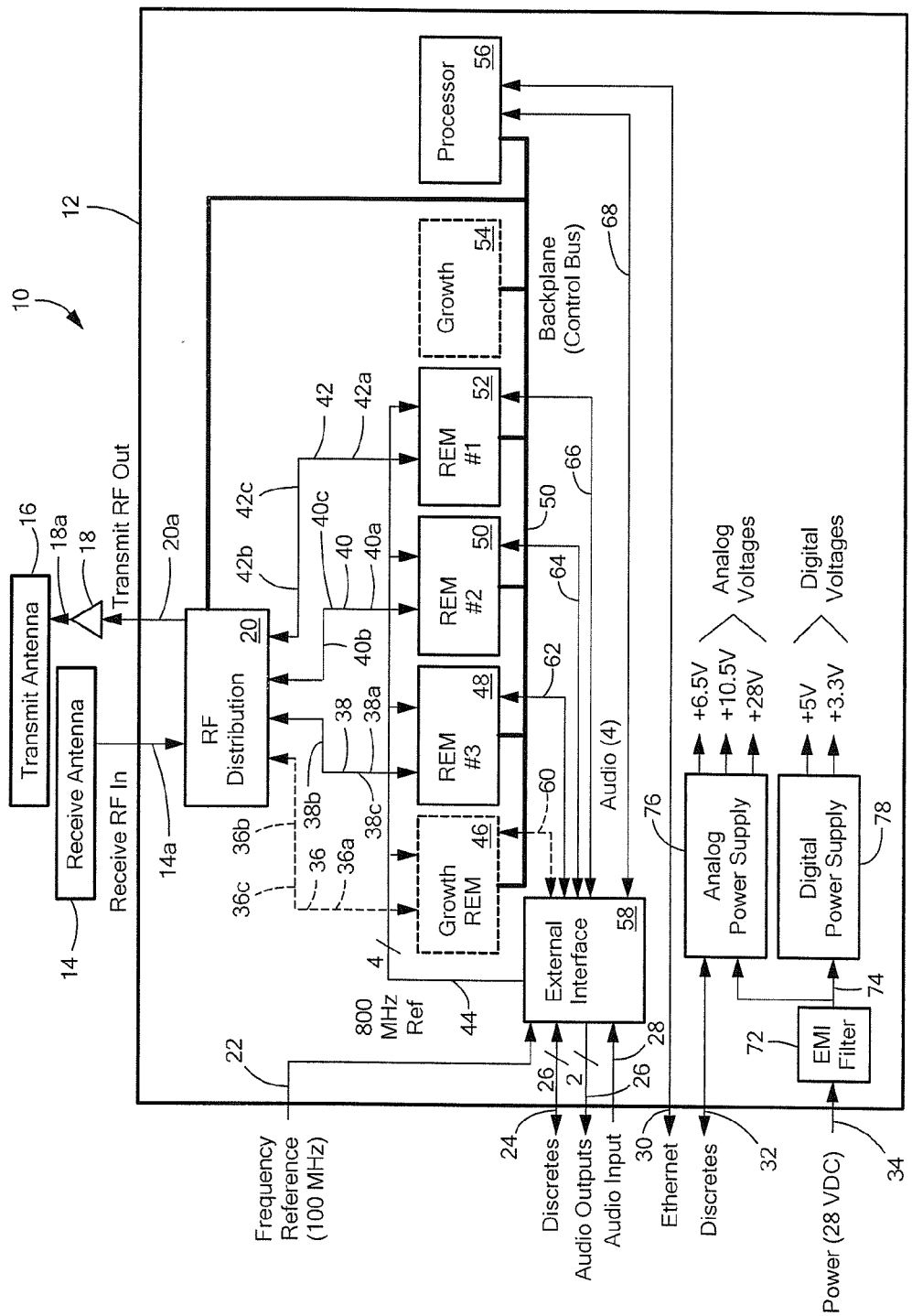
FIG. 1 is a block diagram showing a conventional Multifunction System (MFS) having a plurality of receiver-exciter modules (REMS) and an RF distribution (RFD) module.

Referring to FIG. 1, a conventional MFS includes a chassis 12 coupled to a receive antenna 14 and coupled though an RF power amplifier 18 to a transmit antenna 16. The conventional chassis 12 has a custom rack mount arrangement configured to hold elements shown therein.

As discussed more fully below, the MFS 10 is configured to receive RF signals with the receive antenna 14, as may be generated, for example, by an RF enemy communications system (transmitter) remote from the MFS 10. The MFS is configured to process the received signals and to generate, via the transmit antenna 16, a jamming RF signal to jam the RF signals generated by the remote RF system.

The receive antenna 14 is coupled to provide an RF receive signal 14a to an RF distribution (RFD) module 20. The RF receive signal 14a can be representative of a signal, for example, a communications signal, generated by a remote RF system.

The RF power amplifier 18 is coupled to receive an RF transmit signal 20a from the RFD module 20. The RF transmit signal 20a can be an RF jamming signal configured to jam a remote RF system.

The RFD module 20 is coupled to communicate signals 36-42 between receiver-exciter modules (REMS) 46-52 and the RFD module 20. The REM 46 is indicated to be a "growth" REM, but is not used in the present system.

Each one of the signals 36-42 is designated having a respective three portions. In operation, at least one of the signals 36-42 can have a respective receive signal portion, i.e., at least one of receive signal portions 36a-42a (representative of the RF receive signal 14a). One of the signals 36-42 can have a respective transmit signal portion, i.e., one of transmit signal portions 36b-42b (representative of the RF transmit signal 20a). The signals 36-42 also have respective control signal portions 36c-42c. The signals 36-42 can have received signals portions or transmit signal portions, but not both, at any particular time.

Each one of the REMS 46-52 is configured into the receive mode or into the transmit mode of operation by way of a control signal 50 generated by a processor 56. For example, the REM 52 and the REM 48 can be placed into receive modes of operation and the REM 50 can be placed into a transmit mode of operation by the processor 56.

Each one of the REMS 46-52 is capable of acting in the receiving mode of operation to process a respective one of the receive signal portions 36a-42a in order to detect an RF signal from a remote RF system and/or to identify characteristics of the respective received signal, for example, an RF carrier frequency, a bandwidth, a modulation type, and a transmission type (e.g., analog or digital).

Each one of the REMS 46-52 is also capable of acting in the transmitting mode of operation to generate a respective one of the transmit signal portions 36b-42b (and therefore, the RF transmit signal 20a) in order to jam the remote RF system. To this end, a REM in the transmit mode of operation can generate a respective one of the transmit signals 36b-42b having the identified characteristics of the detected receive signal portion, for example, having the same RF carrier frequency, the same bandwidth, the same modulation type, and/or the same transmission type (e.g., analog or digital).

Thus, each one of the REMS 46-52 can operate as a receiver that receives, detects, and processes an RF signal, or it can operate as a signal generator that generate an RF jamming signal.

It should be understood that each one of the signals 36-42 can be representative of either the RF receive signal 14a or of the RF transmit signal 20a, under control by the processor 56. Thus, the RFD module 20 is also coupled to receive one of the transmit signal portions 36b-42b (one of which can be representative of the transmit signal 20a) from the plurality of receiver-exciter modules (REMS) 46-52.

The control signal 50 can be transmitted from the processor 56 to the REMS 46-52 and also from the REMS 46-52 to the processor 56. In this way, the processor 56 can receive information pertaining to an RF signal received from a remote system, for example, the RF carrier frequency, the bandwidth, the modulation type, and/or the transmission type (e.g., analog or digital), as provided by one of the REMS 46-52.

Each one of the REMS 46-52 can be placed into different types of receive modes of operation by the processor 56. For example, the REM 52 can be placed into a detection receive mode of operation that continually scans a wide band of RF frequencies in order to detect the presence of signal (a detected signal) from a remote RF system that is on an unknown radio channel. For another example, the REM 46 can be placed into an analysis receive mode of operation that analyzes the signal characteristics of the detected signal, for example, the RF carrier frequency, the bandwidth, the modulation type, and/or the transmission type (e.g., analog or digital) of the detected signal identified by the REM 52. Thus, one of the REMS 46-52 can continually scan for the presence of a signal (a detected signal) from a remote RF system and another one of the REMS can analyze the detected signal. Other receive modes of operation are also possible.

Each one of the REMS 46-52 (or, more precisely, any one of the REMS 46-52), when in the transmit mode of operation, is capable of generating a variety of types of analog modulated and analog unmodulated transmit signals on a selectable RF carrier frequency, including, but not limited to analog AM signals, analog FM signals, and analog CW (continuous) signals. Each one of the REMS 46-52 is also capable of generating a variety of types of digital modulated transmit signals on a selectable RF carrier frequency, including, but not limited to, on-off keyed (OOK) signals, phase shift keyed (PSK) signals, frequency shift keyed (FSK) signals, and pseudorandom noise signals.

In addition, each one of the types of analog modulated signals can carry a baseband signal, for example, a voice or audio signal, which can be received by the system 10 as an audio input signal 28, as may be provided by other electronic modules outside of the system 10.

When in the receive mode of operation, each one of the REMS 46-52 can provide a respective baseband audio signal 60-66 representative of information or communication content (e.g., voice) within the RF receive signal 14a, received from the remote RF system.

An external interface module 58 is coupled to receive the audio signals 60-62 from the REMS 46-52 and to provide at least two audio output signals 26. The external interface module is also coupled to receive at least one audio input signal 28 communicated to at least one of the REMS 46-52 placed in the transmit mode of operation.

The external interface module 58 is also coupled to receive a frequency reference signal 22, for example, a 100 MHz signal, and configured to generate a reference signal 44, for example, an 800 MHz signal, which can be communicated to the REMS 46-52.

The system 10 can provide an Ethernet signal 30 to and from the processor 56.

The system can include an analog power supply 76 to power analog circuits, and a digital power supply 78 to power digital circuits within the system 10. The analog power supply 76 and the digital power supply 78 can be coupled to receive a filtered DC voltage signal 74 provided by a filter 72 coupled to receive a DC power supply signal 34, for example a twenty-eight volts DC signal. The analog power supply 76 can provide one or more analog supply voltages and the digital power supply 78 can provide one or more digital supply voltages.

Figure 2:
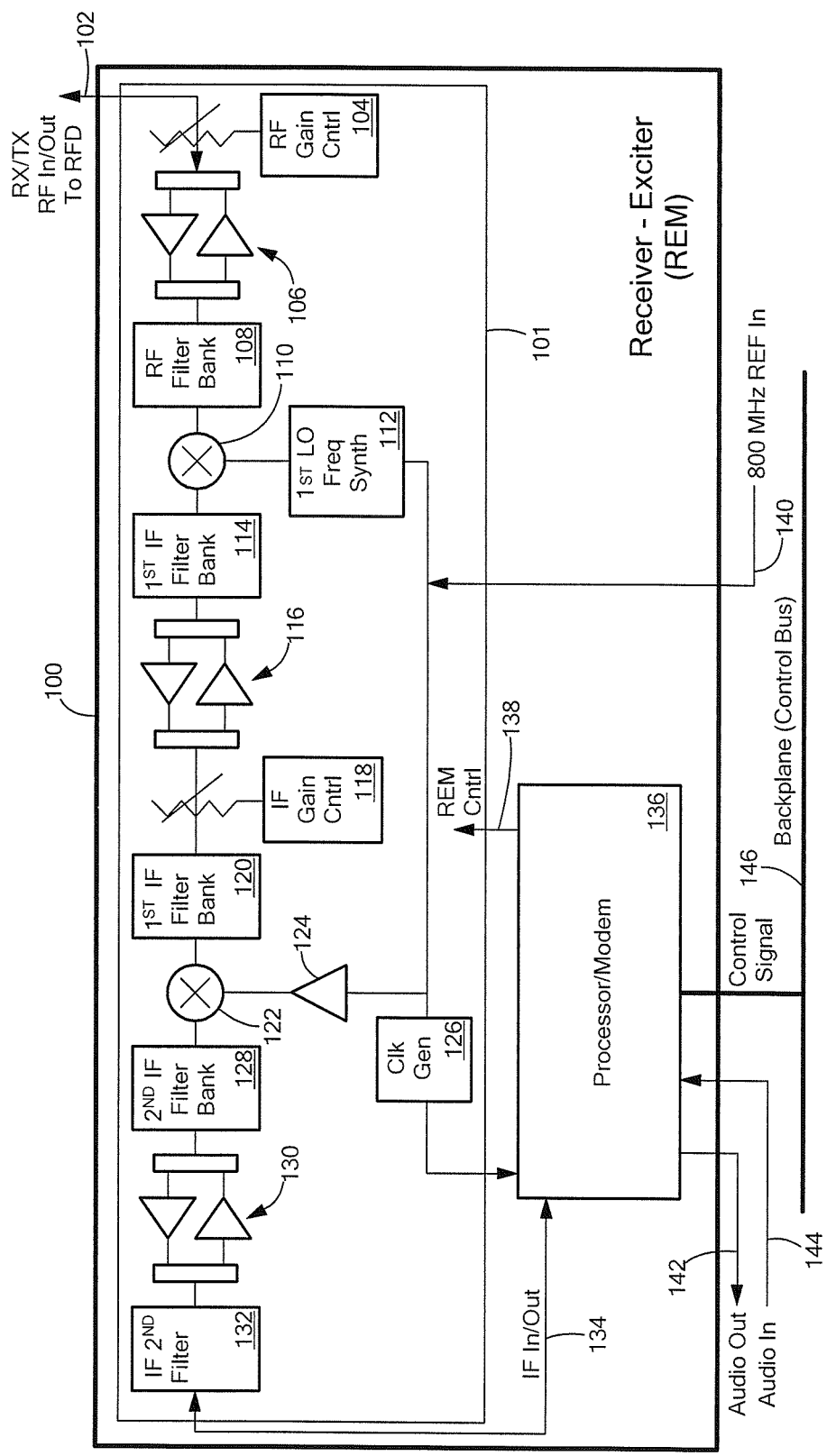
FIG. 2 is a block diagram showing a conventional receiver-exciter module as may be used in the conventional MFS of FIG. 1.

Referring now to FIG. 2, a conventional REM 100 can be the same as or similar to any one of the REMS 46-52 of FIG. 1. The REM 100 includes an analog portion 101. When in any of the above-described receive modes of operation, signal paths within the analog portion 101 flow from right to left. When in the above-described transmit mode of operation, signal paths within the analog portion 101 flow from left to right.

Taking first the receive mode of operation, the analog portion 101 is coupled to receive a signal 102, which is representative of the RF receive signal 14a of FIG. 1, and which is the same as or similar to one of the receive signal portions 36a-42a of FIG. 1. The signal 102 can contain an RF signal received from a remote RF system, or it can contain no signal other than a noise signal.

Conventional signals within the REM 100 are only generally described herein. The signal 102 is received at an RF gain control stage 104, to adjust a magnitude of the signal. The signal propagates to a directional stage 106, the direction of which is controlled by an REM control signal 138. The signal propagates to an RF filter banks and to a first mixer 110, which translates the signal to a first intermediate frequency (IF) frequency.

The mixer 110 uses a mixing frequency provided by a frequency synthesizer having a frequency controlled by the REM control signal 138. Thus, the first mixer 110 can "tune" to a one or more frequencies within a range of center frequencies (i.e., RF channels), in order to either sweep among a plurality of RF frequencies in order to attempt to detect an RF signal, or the first mixer 110 can stop at one center frequency (RE channel) in order to analyze the signal content of a detected RF signal at a previously identified frequency.

The signal then propagates to a first IF filter bank 114 and to another directional stage 116, the direction of which is also controlled by the REM control signal 138. The signal then propagates to an IF gain control stage 118, to adjust a magnitude of the IF signal. The signal then propagates to another IF filter bank 120 and then to another mixer 122, which translates the signal to a second IF frequency. The signal then propagates to another IF filter bank 128 and to another directional stage 130, the direction of which is also controlled by the REM control signal 138. The signal then propagates to another IF filter 132, which provides an IF receive signal 134.

The IF receive signal 134 is received by a modem portion of a processor/modem 136. The modem portion is configured to convert the IF receive signal 134 into a digital signal for processing by a processor portion of the processor/modem 136.

As described above, the processor portion of the processor/modem 136 can be placed by a control signal 146 (provided by the processor 56 of FIG. 1) into one or more receive processing modes of operation. In the above-described detection receive mode of operation, the processor portion of the processor/modem 136 can continually scan RF channels for the presence of an RF signal transmitted by the remote RF system. In the above-described analysis receive mode of operation, upon detecting or otherwise being told of a detection of a transmission from a remote RF system, the processor portion of the processor/modem 136 can analyze the detected signal and can identify characteristics of the detected signal. The processor portion of the processor/modem 136 can communicate the identified characteristics to the processor 56 of FIG. 1, which, in turn, can communicate the characteristics to another one of the REMS 46-52, placing the one of the REMS 46-52 into a transmit mode of operation.

Taking now the transmit mode of operation, a digital jamming signal is generated by the processor portion of the processor/modem 136 in accordance with the processed signal characteristics of the received signal communicated by the processor 56. The jamming signal is converted by the modem portion of the processor/modem 136 to an IF transmit signal 134. The signal takes a reverse path through the analog portion 101, with each one of the directional stages 130, 116, 106 configured in a left to right path by the REM control signal 138. Ultimately, an RF signal 102 is generated by the REM 100, which is carried on an RF channel determined by the frequency synthesizer 112.

The RF signal 102 has a jamming signal therein and is representative of the transmit (jamming) signal 20a of FIG. 1.

It will be appreciated that processing provided by the processor/modem 136 described above can be partitioned in any way between processor/modems of any of the REMS 46-52 of FIG. 1 and between the processor 56 of FIG. 1.

Figure 3:
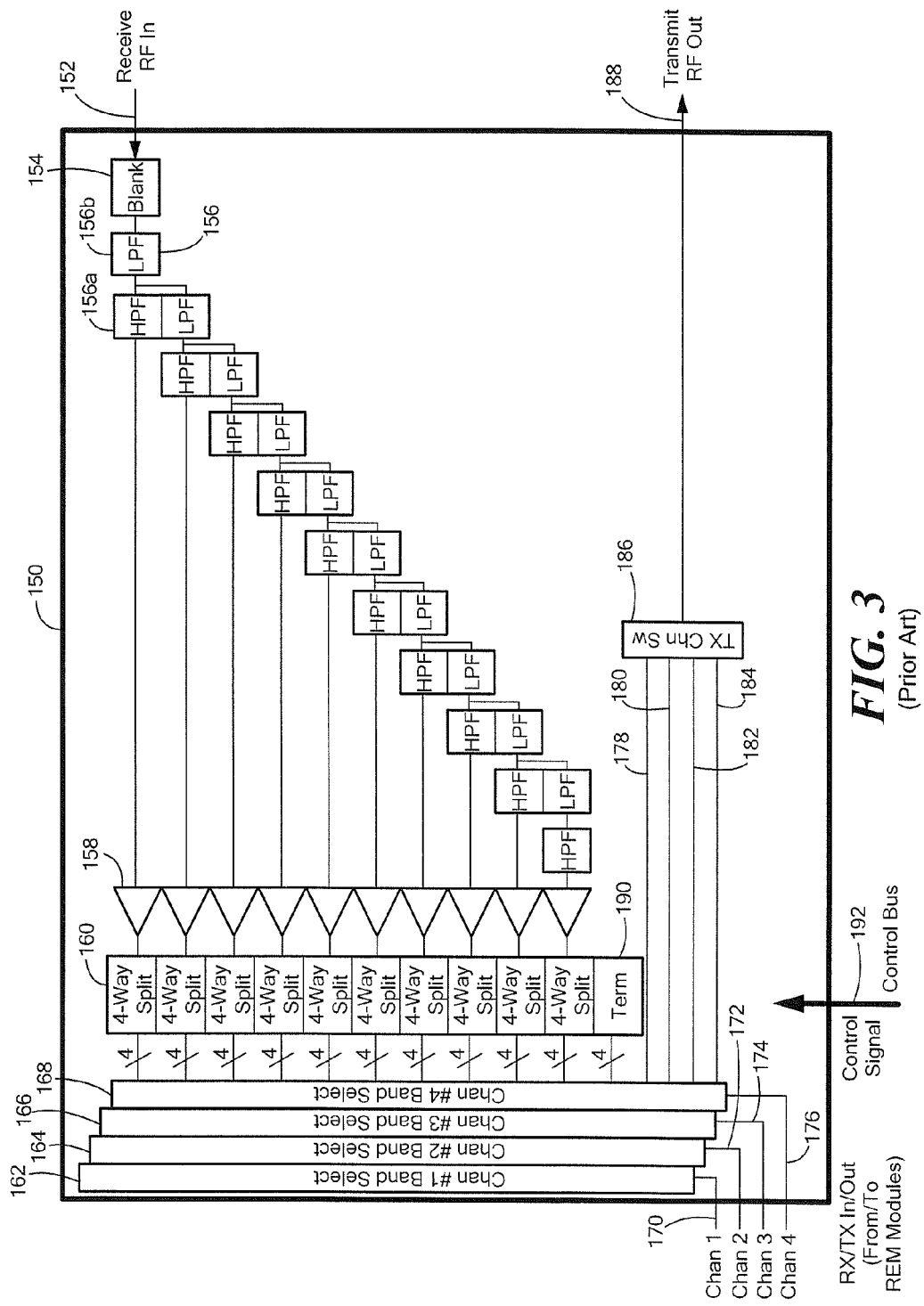
FIG. 3 is a block diagram showing and RFD module as may be used in the conventional MFS of FIG. 1.

Referring now to FIG. 3, a conventional RF distribution (RFD) module 150 can be the same as or similar to the RFD module 20 of FIG. 1.

When in the receive mode of operation, the RFD module 150 is coupled to receive a receive signal 152, which can be the same as or similar to the receive signal 14a of FIG. 1. The RFD module can include a blanking switch 154 coupled to receive the receive signal 152 and configured to provide RF impedance matching to the antenna 14.

A plurality of band pass filters, each comprising a low pass filter and a high pass filter, can receive a signal from the blanking switch 154. A band pass filter 156 comprising a high pass filter 156a and a low pass filter 156b is representative of other ones of the plurality of band pass filters.

A respective RF amplifier, for example, an RF amplifier 158, can be coupled to receive a signal from a respective band pass filter, e.g., band pass filter 156. Signals from the plurality of band pass filters are split four ways by a respective plurality of four-way splitters, of which a four-way splitter 160 is but one example. Each four-way splitter provides four output signals to each of four receive channels, respectively.

The RFD module 150 can include four channel band select modules 162-168, associated with the four REM modules 46-52, respectively, of FIG. 1. The four channel band select modules 162-168 are coupled to provide signals 170-176, respectively, coupled to the REMS 46-52 of FIG. 1. The signals 170-176 are the same as or similar to the signals 36-42 of FIG. 1, each having either a receive signal portion or a transmit signal portion, and also having a control signal portion as described above in conjunction with FIG. 1.

Control of the band select modules 162-168 is accomplished by way of the control signal portions of the signals 170-176 in combination with control signal 192. The control signal 192 can be the same as or similar to the control signal 50 of FIG. 1.

With the various control signals, one or more of the bands (i.e., one or more of the signals 170-176, i.e., one or more of the REMS 46-52 of FIG. 1) can be designated to be in a receive mode of operation, and one of the bands (i.e., one of the signals 170-176, i.e., one of the REMS 46-52 of FIG. 1) can be designated to be in the transmit mode of operation. Furthermore, bands that are in the receive mode of operation can have different receive modes of operation as described above. For example, one of the bands (REMS) in the receive mode of operation can receive information from all of the band pass filters in order to sweep a plurality of RF channels. Other bands (REMS) in the receive mode of operation can receive information from only one of the band pass filters.

For any one of the REMS 46-52 that is in the transmit mode of operation, as described above, a respective one of the signals 170-172 includes a transmit signal portion corresponding to one of the signals 36b-42b of FIG. 1. The transmit signal portion is routed to one of the signals 178-184 and to a transmit channel switch 186 that selects the channel (i.e., the REM 46-52 of FIG. 1) that is in the transmit mode of operation, resulting in one transmit signal 188 corresponding to the transmit signal 20a of FIG. 1. Selection of the transmit channel (i.e., REM in transmit mode) is accomplished by way of the control signal 192 and/or by way of the control signal portion of one of the signals 170-176.

The RFD module 150 can also include a terminator 190 that provides an RF impedance termination for any one of the channels (REMS) that is not used.

The RFD 150 is configured to allow communication of one or more RF receive signals to one or more receive channels (REMS) at the same time. However, the RFD 150 is configured to either pass the one or more receive signals or to pass one transmit signal from one transmit channel (REM), but not both at the same time.

It will be recognized that the conventional MFS can pass only one RF transmit signal 20a using only one transmit antenna 16 (FIG. 1). However, it is desirable to provide an MFS that can transmit a plurality of RF transmit signals using a plurality of transmit antennas without changing the overall architecture of the MFS.

Figure 4:
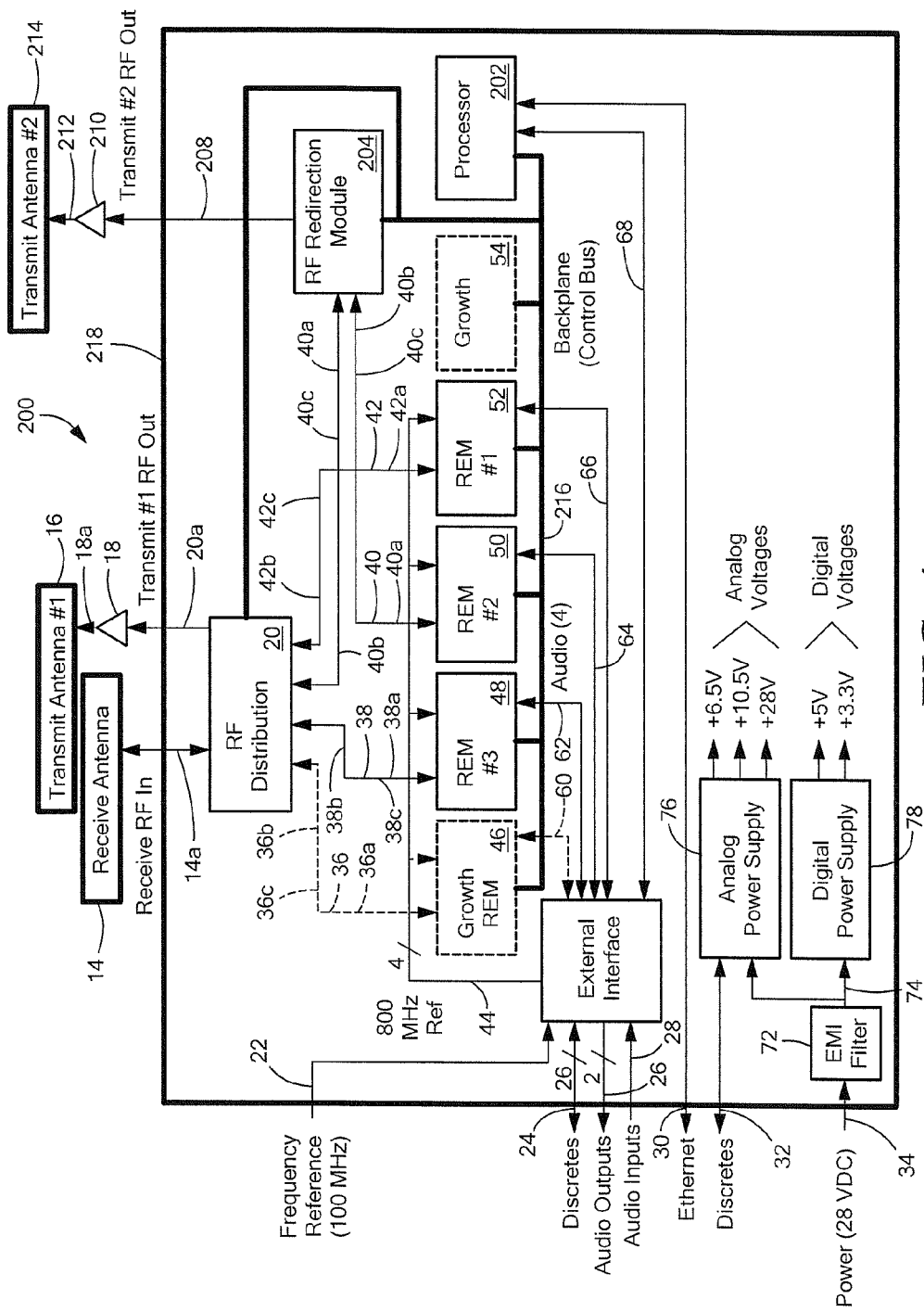
FIG. 4 is a block diagram showing a modified MFS having the plurality of receiver-exciter modules (REMS) of FIG. 1, the RF distribution (RFD) module of FIG. 1, and also having an RF redirection module.

Referring now to FIG. 4, in which like elements of FIG. 1 are shown having like reference designations, a modified MFS 200 can include all of the elements of the conventional MFS 10 described above in conjunction with FIGS. 1-3. However, the modified MFS 200 includes additional elements. In particular, the modified MFS 200 can include an RF redirection module 204 coupled to intercept and redirect portions of the signal 40.

As described above in conjunction with FIG. 1, the signal 40 can include a receive signal portion 40a provided from the RFD module 20 to the REM 50 or a transmit signal portion 40b provided by the REM 50 to the RFD module 20. However, in FIG. 4, a transmit signal 208 representative of the transmit signal portion 40b can be routed to a second transmit antenna 214 via a power amplifier 210.

In a first coupling arrangement, the RF redirection module 204 can couple the signal 40 (i.e., the transmit signal portion 40b or the receive signal portion 40a) to or from the RFD module 20. The first coupling arrangement can be used when the REM 50 is in the receive mode of operation or when the REM 50 is in the transmit mode of operation. With this coupling arrangement, the modified MFS 200 behaves like the conventional MFS 10, using only the receive antenna 14 and/or the transmit antenna 16 (a first transmit antenna).

However, in a second coupling arrangement, the RF redirection module 204 couples the signal 40 (in particular, the transmit signal portion 40b) to provide a second transmit signal 208, representative of the transmit signal portion 40b, to a second RF power amplifier 210, resulting in a signal 212 communicated to a second RF transmitting antenna 214. Thus, only when the REM 50 is in a transmit mode of operation, the REM 50 can provide a transmit signal to the first transmit antenna 16 or to the second transmit antenna 214.

With the second coupling arrangement, two of the REMS 46-52 can be in the transmit mode of operation at the same time. In other words, one of the REMS 46, 48, 52 can generate a first transmit signal (36b, 38b, or 42b) communicated to the first transmit antenna 16 via the RFD module 20, and the REM 50, at the same time, can generate a second transmit signal 208 (representative of the transmit signal 40b) communicated to the second transmit antenna 214 via the RF redirection module 204.

To accomplish the two coupling arrangements, a processor 202 can have different control logic than the processor 56 of FIG. 1, and a control signal 216 can be different than the control signal 50 of FIG. 1 accordingly.

It should be appreciated that a chassis 218 can be the same as or similar to the chassis 12 of FIG. 1 of the conventional MFS. In other words, physical characteristics of the conventional MFS 10 of FIG. 1 need not be substantially changed in order to accommodate the RF redistribution module 204. Only a small amount of rewiring of the conventional MFS 10 is needed.

While the RF redirection module 204 is shown to be coupled to the REM 50, the RF redirection module 204 can be coupled instead to another one of the REMS. While one RF redirection module 204 is shown, in other arrangements there can be more than one RF redirection module, each coupled to one of the REMS and each coupled to a dedicated transmit antenna.

Figure 5:
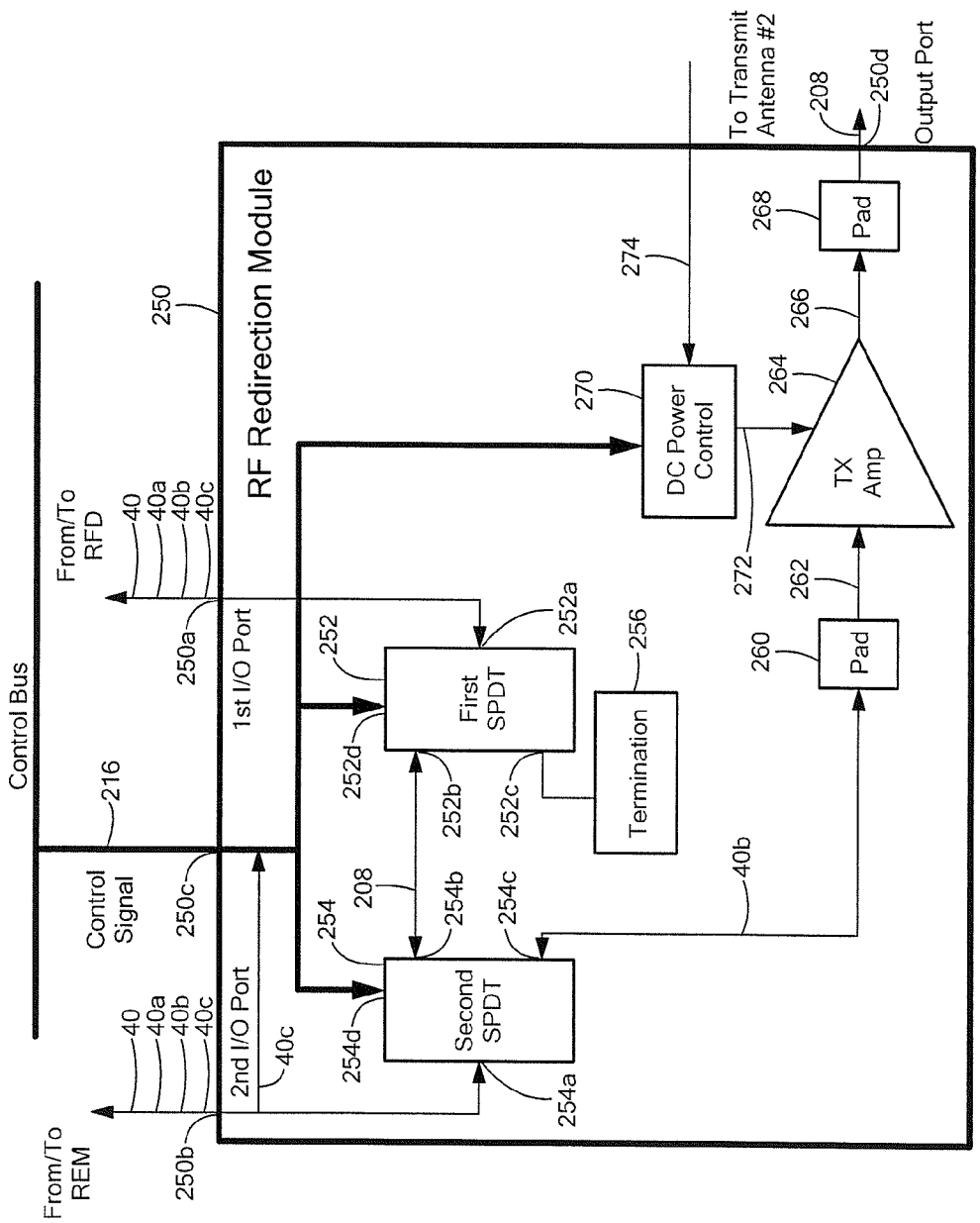
FIG. 5 is a block diagram showing an exemplary RF redirection module as may be used in the modified MFS of FIG. 4.

Referring now to FIG. 5, in which like elements of FIG. 4 are shown having like reference designations, an exemplary RF redirection module 250 can be the same as or similar to the RF redirection module 204 of FIG. 4.

The RF redirection module 250 can include a first bidirectional input/output port 250a configured to receive an RF receive signal 40a or to output an RF transmit signal 40b. The RF redirection module 250 can also include a second bidirectional input/output port 250b configured to output the RF receive signal 40a or to input the RF transmit signal 40b. The RF redirection module 250 can also include an RF output port 250d configured to output a signal 208 representative of the RF transmit signal 40b. The RF redirection module 250 can also include a control port 250c coupled to receive the control signal 216. In response to the control signal 216, the RF redirection module 250 is configured either: a) to receive the RF receive signal 40a at the first bidirectional input/output port 250a, to output the RF receive signal 40a at the second bidirectional input/output port 250b, and to output no signal at the RF output port 250d, b) to receive the RF transmit signal 40b at the second bidirectional input/output port 250b, to output the signal 208 representative of the RF transmit signal 40b at the RF output port 250d, and to input or output no signal at the first bidirectional input/output port 250a, or c) to receive the RF transmit signal 40b at the second bidirectional input/output port 250b, to output the RF transmit signal 40b at the first bidirectional input/output port 250a, and to output no signal at the RF output port 250d.

The RF redirection module 250 can include a first RF switch 252 having a pole terminal 252a and first and second throw terminals, 252b, 252c, respectively. It will be understood that such a switch is commonly referred to as a Single-Pole, Double-Throw (SPDT) switch. The pole terminal 252a of the first RF switch 252 can be coupled to the first bidirectional input/output port 250a. The RF redirection module 250 can also include a second RF switch 254 having a pole terminal 254a and first and second throw terminals 254b, 254c, respectively. The pole terminal 254a of the second RF switch 254 can be coupled to the second bidirectional input/output port 250b.

The first throw terminal 252b of the first RF switch 252 is coupled to the first throw terminal 254b of the second RF switch 254.

The RF redirection module 250 can also include an RF transmit amplifier 264 coupled to the second throw terminal 254c of the second RF switch 254.

The RF redirection module 250 can also include an impedance termination 256 coupled to the second throw terminal 252c of the first RF switch 252.

The RF redirection module 250 can also include a power control circuit 270 coupled to receive the control signal 216 and configured generate a DC power signal 272 to power the RF transmit amplifier 264 when the RF output port 250d is activated.

The first bidirectional input/output port 250a is configured to couple to an RF distribution module (e.g., the RFD module 20 of FIG. 4) and the second bidirectional input/output port 250b is configured to couple to a receiver-exciter module (e.g., the receiver-exciter module 50 of FIG. 4) so that the RF redirection module 250 is coupled between the RF distribution module 20 and the receiver-exciter module 50. As described above, the RF distribution module 20 is configured to couple to a receive antenna 14 and to a first transmit antenna 16.

The RF output port 250d is configured to couple to a second transmit antenna, e.g., the second transmit antenna 214 of FIG. 4, via an RF power amplifier 210.

While particular switches are shown in a particular arrangement, it will be understood that the same or similar switch functions can be accomplished with other arrangements of switches.

All references cited herein are hereby incorporated herein by reference in their entirety.

Having described preferred embodiments, which serve to illustrate various concepts, structures and techniques, which are the subject of this patent, it will now become apparent to those of ordinary skill in the art that other embodiments incorporating these concepts, structures and techniques may be used. Accordingly, it is submitted that that scope of the patent should not be limited to the described embodiments but rather should be limited only by the spirit and scope of the following claims.

What is claimed is:

1. An RF redirection module, comprising:
   a first bidirectional input/output port configured to receive an RF receive signal or to output an RF transmit signal;
   a second bidirectional input/output port configured to output the RF receive signal or to input the RF transmit signal;
   an RF output port configured to output a signal representative of the RF transmit signal; and
   a control port coupled to receive a control signal, wherein, in response to the control signal, the RF redirection module is configured either:
   a) to receive the RF receive signal at the first bidirectional input/output port, to output the RF receive signal at the second bidirectional input/output port, and to output no signal at the RF output port,
   b) to receive the RF transmit signal at the second bidirectional input/output port, to output the signal representative of the RF transmit signal at the RF output port, and to input or output no signal at the first bidirectional input/output port, or
   c) to receive the RF transmit signal at the second bidirectional input/output port, to output the RF transmit signal at the first bidirectional input/output port, and to output no signal at the RF output port,
   wherein the first bidirectional input/output port is configured to couple to an RF distribution module and wherein the second bidirectional input/output port is configured to couple to a receiver-exciter module so that the RF redirection module is coupled between the RF distribution module and the receiver-exciter module.

2. The RF redirection module of claim 1, further comprising:
   a first RF switch having a pole terminal and first and second throw terminals, wherein the pole terminal of the first RF switch is coupled to the first bidirectional input/output port; and
   a second RF switch having a pole terminal and first and second throw terminals, wherein the pole terminal of the second RF switch is coupled to the second bidirectional input/output port.

3. The RF redirection module of claim 1, wherein the first throw terminal of the first RF switch is coupled to the first throw terminal of the second RF switch.

4. The RF redirection module of claim 1, further comprising:
   an RF transmit amplifier coupled to the second throw terminal of the second RF switch.

5. The RF redirection module of claim 4, further comprising:
   a power control circuit coupled to receive the control signal and configured generate a DC power signal to power the RF transmit amplifier.

6. The RF redirection module of claim 1, wherein the RF distribution module is configured to couple to a receive antenna and to a first transmit antenna.

7. The RF redirection module of claim 6, wherein the RF output port is configured to couple to a second transmit antenna.

8. The RF redirection module of claim 1, wherein the RF output port is configured to couple to a transmit antenna.

9. The RF redirection module of claim 1, wherein the RF receive signal is representative of a signal emitted by a remote RF transmitter.

10. The RF redirection module of claim 9, wherein the RF transmit signal has characteristics calculated to interfere with the signal emitted by the remote RF transmitter.

11. The RF redirection module of claim 10, wherein the RF transmit signal comprises at least one of a continuous wave (CW) type of signal, an amplitude modulated (AM) type of signal modulated by an analog or a digital baseband signal, a frequency modulated (FM) type of signal modulated by an analog or a digital baseband signal, or a phase modulated (PM) type of signal modulated by a digital baseband signal.

12. The RF redirection module of claim 1, wherein the RF transmit signal has characteristics calculated to interfere with a signal emitted by a remote RF transmitter.

13. The RF redirection module of claim 12, wherein the RF transmit signal comprises at least one of a continuous wave (CW) type of signal, an amplitude modulated (AM) type of signal modulated by an analog or a digital baseband signal, a frequency modulated (FM) type of signal modulated by an analog or a digital baseband signal, or a phase modulated (PM) type of signal modulated by a digital baseband signal.

* * * * *